US009082144B2

(12) United States Patent
Jones et al.

(10) Patent No.: US 9,082,144 B2
(45) Date of Patent: Jul. 14, 2015

(54) TRANSPORTATION SERVICE MATCHING WITH ARRIVAL ESTIMATION ADJUSTED FOR EXTERNAL FACTORS

(71) Applicant: CARGO CHIEF, Palo Alto, CA (US)

(72) Inventors: Russell Jones, Palo Alto, CA (US); Abtin Hamidi, Palo Alto, CA (US); Subodh Patel, Palo Alto, CA (US); Chennavajulasrinivasa anantapadmanabha Sarma, Palo Alto, CA (US)

(73) Assignee: CARGO CHIEF, Palo Alto, CA (US)

( * ) Notice: Subject to any disclaimer, the term of this patent is extended or adjusted under 35 U.S.C. 154(b) by 0 days.

(21) Appl. No.: 14/625,265

(22) Filed: Feb. 18, 2015

(65) Prior Publication Data

US 2015/0161696 A1   Jun. 11, 2015

(51) Int. Cl.
*G06Q 10/08* (2012.01)
*G06Q 30/08* (2012.01)
*G06Q 30/06* (2012.01)

(52) U.S. Cl.
CPC .......... *G06Q 30/0611* (2013.01); *G06Q 10/083* (2013.01); *G06Q 10/0833* (2013.01); *G06Q 10/0837* (2013.01); *G06Q 10/0838* (2013.01); *G06Q 10/08355* (2013.01); *G06Q 30/08* (2013.01); *G06Q 10/0834* (2013.01); *G06Q 10/08345* (2013.01)

(58) Field of Classification Search
CPC ............ G06Q 10/083; G06Q 10/0833; G06Q 10/0834; G06Q 10/08345; G06Q 10/0837; G06Q 10/0838; G06Q 30/08

USPC ........ 705/26.3, 330, 333, 334, 335, 338, 340, 705/341
See application file for complete search history.

(56) References Cited

U.S. PATENT DOCUMENTS 6,697,730 B2   2/2004   Dickerson
6,951,020 B2   9/2005   Ricciardi
(Continued)

FOREIGN PATENT DOCUMENTS

WO    WO-01/57614 A2  *  8/2001

OTHER PUBLICATIONS

Anon., "Empty Bus no Place to Take a Stand," Evening Sun [Hanover, Pa] Jan. 13, 2012.*
(Continued)

*Primary Examiner* — Nicholas D Rosen
(74) *Attorney, Agent, or Firm* — Nath, Goldberg & Meyer; Jerald L. Meyer; Stanley N. Protigal

(57) ABSTRACT

Matches for load or transportation services with transportation service providers (TSPs) are established, and estimated arrival times are provided. A transportation service request is provided and a received bid is received. An estimate of time of arrival is made based on an estimation of a time for performing a delivery of the load or provide the transportation service, and the time of arrival estimate is adjusted by at least one external factor expected to affect transit time. An anticipated turn-around time for availability of the TSP is made for a subsequent leg or backhaul and the adjusted time of arrival estimate and the anticipated turn-around time are used to estimate a time of availability of the TSP for the subsequent leg or backhaul. An accepted bid for the subsequent leg or backhaul is made based on an estimated time of availability.

14 Claims, 5 Drawing Sheets

(56) References Cited

U.S. PATENT DOCUMENTS

| | | |
|---|---|---|
| 6,990,467 B1 | 1/2006 | Kwan |
| 7,319,414 B2 * | 1/2008 | Horstemeyer ............... 340/994 |
| 7,324,968 B2 * | 1/2008 | Rotman et al. ................ 705/37 |
| 7,430,517 B1 | 9/2008 | Barton |
| 7,478,055 B2 * | 1/2009 | Goino ......................... 705/26.3 |
| 7,483,883 B2 | 1/2009 | Barth et al. |
| 7,627,606 B2 | 12/2009 | Barth |
| 7,668,809 B1 | 2/2010 | Kelly et al. |
| 7,668,811 B2 | 2/2010 | Janssens et al. |
| 7,698,204 B2 | 4/2010 | Abendroth |
| 7,765,120 B2 | 7/2010 | Yadappanavar et al. |
| 7,774,331 B2 | 8/2010 | Barth et al. |
| 7,840,427 B2 | 11/2010 | O'Sullivan |
| 7,979,457 B1 | 7/2011 | Garman |
| 8,095,536 B1 | 1/2012 | Kelly et al. |
| 8,224,571 B2 | 7/2012 | Huang et al. |
| 8,315,921 B2 | 11/2012 | Hallowell et al. |
| 8,458,162 B2 | 6/2013 | Barth et al. |
| 8,566,214 B2 * | 10/2013 | Cavanaugh et al. ............ 705/37 |
| 8,583,485 B2 | 11/2013 | Spurr et al. |
| 8,600,665 B2 | 12/2013 | Vander Linde et al. |
| 8,600,784 B1 | 12/2013 | Ivey et al. |
| 8,645,228 B2 | 2/2014 | Moussa et al. |
| 8,719,251 B1 | 5/2014 | English et al. |
| 8,862,500 B1 | 10/2014 | Mayfield |
| 8,874,492 B2 | 10/2014 | Zacharia et al. |
| 9,020,754 B2 * | 4/2015 | Modica et al. ................ 701/465 |
| 2001/0056396 A1 * | 12/2001 | Goino ............................ 705/37 |
| 2002/0103728 A1 * | 8/2002 | Naghshineh et al. ........... 705/29 |
| 2003/0046133 A1 | 3/2003 | Morley et al. |
| 2003/0182222 A1 * | 9/2003 | Rotman et al. ................. 705/37 |
| 2005/0228857 A1 | 10/2005 | Ricciardi |
| 2005/0229180 A1 | 10/2005 | Ricciardi |
| 2007/0255627 A1 | 11/2007 | Hallowell et al. |
| 2008/0154854 A1 | 6/2008 | Ritter |
| 2008/0281719 A1 | 11/2008 | Hall et al. |
| 2009/0099953 A1 * | 4/2009 | Cavanaugh et al. ............ 705/37 |
| 2009/0150343 A1 | 6/2009 | English et al. |
| 2009/0192851 A1 * | 7/2009 | Bishop .............................. 705/7 |
| 2009/0234577 A1 * | 9/2009 | Rinscheid ..................... 701/201 |
| 2010/0169000 A1 * | 7/2010 | Overgoor et al. ............. 701/204 |
| 2011/0238457 A1 * | 9/2011 | Mason et al. ................ 705/7.14 |
| 2012/0078743 A1 * | 3/2012 | Betancourt ................. 705/26.3 |
| 2012/0179673 A1 | 7/2012 | Kelly et al. |
| 2012/0209787 A1 * | 8/2012 | Foulds et al. ................. 705/333 |
| 2013/0024404 A1 | 1/2013 | Zacharia et al. |
| 2013/0073323 A1 | 3/2013 | Zacharia et al. |
| 2013/0080206 A1 * | 3/2013 | LaVoie et al. ................ 705/7.25 |
| 2013/0117142 A1 * | 5/2013 | Thompson et al. .......... 705/26.3 |
| 2013/0159059 A1 | 6/2013 | Malov |
| 2014/0012772 A1 | 1/2014 | Pretorius |
| 2014/0025524 A1 * | 1/2014 | Sims et al. ................... 705/26.3 |
| 2014/0195525 A1 | 7/2014 | English et al. |
| 2014/0288821 A1 * | 9/2014 | Modica et al. ................ 701/465 |

OTHER PUBLICATIONS

U.S. Appl. 14/625,292 Abstract and Claims, filed Feb. 18, 2015.*
U.S. Appl. 14/625,302 Abstract and Claims, filed Feb. 18, 2015.*

* cited by examiner

TRANSPORTATION SERVICE MATCHING WITH ARRIVAL ESTIMATION ADJUSTED FOR EXTERNAL FACTORS

BACKGROUND

1. Field

This disclosure relates to logistics, aggregation of data and bidding for logistics handling. More specifically, the disclosure relates to data aggregation useful in associating demand for transportation with availability of resources related to the transportation, the acceptance of bids and optimization of routing. A specific non-limiting disclosed example is data aggregation useful in associating demand for shipping with availability of shipping resources.

2. Background

Shipping has historically been executed through a variety of private Transportation Service Providers (TSPs) as carriers, in which the TSPs use different business models. Also included are large trucking companies, owner-operators, private fleet carriers, courier and shipment consolidation companies and shipment transport companies following other business models. There are differences in transport capabilities, such as non-bulk cargo (boxes and pallets), bulk, liquid, reefer, flatbeds and cargo container frames. In addition, there are varying capacities within each category.

For purposes of transportation services, a "shipper" may be anyone who requests transportation services from a TSP. The shipper may be the entity providing goods needing transport. In the alternative, the shipper may be a party receiving goods, and who arranges for transportation services of the goods. The passenger transportation equivalent would be the passenger, although in some cases, the logistical arrangements are fully made without the direct involvement of the passenger. For purposes of this disclosure, "shipper" is intended to mean anyone who commissions transportation services. If specific categories of transportation are specified, the meaning of "shipper" would be limited as required by the categories.

Typical shipping is accomplished by directly engaging a transport company, such as a package delivery service, shipping by private fleet controlled by the shipper, brokering services and other transport arrangements. In many cases, the transport is performed on a bid basis, using TSPs such as common carrier haulers.

Private fleets are often established by a manufacturer, distributor or a retailer with distribution facilities, and establishes its own fleet of vehicles, as the private fleet, to meet its own transportation needs. Regardless, private fleets often provide transportation services on the open market, especially in their backhaul (return trip) capacity.

In the case of transportation on a bid basis, this is traditionally accomplished by the shipper sending requests for bids to multiple haulers, at least in the case of land based TSPs, who function as venders of transportation services. In some cases, the shipper uses a broker or consolidator, who in turn either requests bids from haulers such as TSPs or other transportation entities or otherwise makes arrangements with haulers. Haulers, on the other hand, seek to obtain shipments in order to maximize their profit. In each case, the ability of the shipper to obtain bids and the ability of the hauler to receive bids is limited to the network and methods they use for sending and receiving bids. In such a case, a shipper and a deadheading hauler may not be aware of each other's availability.

Due to the large volume of requests for shipping quotes, the expected time savings and expected revenue generation, broker services are often used by TSPs. Broker services can use a bid process or can provide shipping rates based on pre-arranged rate schedules. In addition, the broker service accommodates availability of the TSP, so that TSPs are able to use the broker to obtain a load, and the shipping is only arranged for the TSP for times when the TSP is actually available to perform the shipping service.

Time constraints are significant factors for the parties to the shipments. The shipper is interested in meeting a time schedule for when a shipment is picked up, is in-transit and delivered. The TSPs have an interest in being able to closely match the shipper's times, including shipment times for backhaul shipments or other later shipments. The shipper is also time constrained as to work hours and expected time off from work or other obligations.

TSPs, in maximizing profit, must consider the value of a particularly profitable haul in one direction, as offset by possible losses from deadheading (running empty) back. While it is desirable to have each leg generate a profit, it may be that particular shipments in one direction along a shipping lane may be sufficiently profitable to justify either deadheading or taking a loss in the opposite direction. It may be possible to divert the TSP or the TSP's resource in order to increase the return on backhaul trips, but extending the trip time may also result in lost opportunity costs for the more profitable run. In a simplified example, a private fleet may need to balance the need for vehicle availability with the desire for backhaul loads.

Some transportation entities are limited as to geographical area. This can be a matter of preference, or may relate to interstate shipping permits and availability of support facilities. In the case of the TSP being a private fleet carrier, there is often a preference to limit accepted shipments to backhaul shipments returning from in-house shipments. In addition, transportation entities may or may not engage in international cross-border shipping.

The vehicle capabilities also must be considered. This includes the usual distinctions between chassis type, but there is also some opportunity to extend to different markets. As an example, a reefer can haul a non-refrigerated load on the backhaul.

The shipper may have particular requirements for the shipment. In addition to requirements dictated by the type of goods, the shipper may want to check the transportation entity's reputation, may wish to perform a "pre-load check" to verify adequate insurance or an acceptable safety rating, and may have a desire to track the shipment or provide shipment tracking information to the entity receiving the shipment.

Tracking can be achieved by discrete GPS enabled devices, or through the use of a mobile device for which location information is available. For most mobile location-based services implemented at the consumer level, this involves reporting GPS positioning; however, a mobile device is also tracked in the mobile network for purposes of establishing a communications handshake with the mobile telecommunications system as part of the mobile device's roaming and basic communication capability (roaming within or outside of the subscriber network). This is sometimes augmented by GPS tracking, but in many cases identifies the mobile device's location by tower and sector. For purposes of tracking the general location of a vehicle, tracking by use of a mobile device requires consent from the mobile customer. The (US) Telecommunications Act, at 47 CFR §222, including 47 CFR §222(f), prohibits telecommunication common carriers from accessing location information for purposes other than system operation without consent of the customer. For this reason, a procedure must be established to assure the tracking service that consent from the mobile device user was obtained. Since the driver may want to know the extent to which the tracking information is used prior to giving consent, it is sometimes not possible to determine whether the driver will accept location tracking and if the driver refuses consent, it may not be possible to obtain actual approval for a particular tracking system.

One of the problems in brokered shipments is that the broker will sometimes not have the information regarding the driver's willingness to accept location tracking. This could be a circumstance of limited communication between the broker and the driver or the driver's TSP or could be something of the nature of the extent of location tracking being unclear. For example, a driver may be willing to accept location tracking of the driver's mobile phone but only if limited to cargo tracking or only if limited to cargo tracking and other functions directly associated with the brokerage.

Shipment tracking is finding increasing use. In addition to providing rough estimates of arrival times, shippers and delivery customers often prefer to have information as to when a shipment is expected to arrive. Taken to another level, shippers prefer to have information relating to the approximate current location of the shipment. In addition to "when will the package arrive" information, current location of the shipment can give the shipper and receiver an idea if the shipment has been delayed or other information related to the shipment. Currently, limited tracking is available for package delivery services, but such information is typically given on a warehouse or depot departure and arrival basis.

In "co-brokered" shipments (one broker sources the TSP and another broker sources the shipper), the broker knows the TSP and also is able to provide this information to the shipper. In some instances, a brokered shipment is "double-brokered" and the broker that sourced the shipper does not necessarily know who the TSP is. Consequently, in "double brokered" shipments, the shipper typically does not know who the TSP is. This is considered undesirable by many shippers, and so the shipper may wish to exclude "double-brokered" bidders if the identity of the TSP is not known to the shipper. In many cases, double brokering is considered a violation of U.S. law (49 USC §14916), which imposes an additional legal requirement for identifying the TSP to the shipper.

"Co-brokering" also involves a shipment agreed to by one broker being fulfilled by a second broker, in which case, the second broker would normally be given the identity of the TSP.

A reverse auction is a type of auction in which the roles of buyer and seller are reversed. In an ordinary auction (also known as a forward auction), buyers compete to obtain a good or service by offering increasingly higher prices. In the case of a performance bid, such as a response to a Request for Quote (RFQ) or Request for Price (RFP), the bidding does not follow the ordinary auction format. In the case of bidding by TSPs, the TSP is the bidder, whereas the shipper selects and accepts a bid. This becomes a "reverse auction" when one or more TSPs are invited to meet actual or estimated bids, because the TSP is being asked to bid a quoted amount lower than the lowest bidder.

SUMMARY

A match for load or transportation services with a transportation service provider (TSP) is made by receiving a transportation service request, in which the transportation request comprises a description of a load or transportation service. Bids are stored in a database, one of the bids is selected, and the bid is confirmed. An estimate is made of a time of arrival estimate based on an estimation of a time for performing a delivery of the load or providing the transportation service. At least one external factor expected to affect transit time is obtained and the time of arrival estimate is adjusted according to the external factor. An anticipated turn-around time for availability of the TSP is calculated for a subsequent leg or backhaul and the adjusted time of arrival estimate and the anticipated turn-around time is used to estimate a time of availability of the TSP for the subsequent leg or backhaul. The TSP's availability to accept a further transportation request, corresponding to the TSP's capabilities, is associated with the TSP for a backhaul or additional leg. If the TSP associated with the accepted bid accepts the further transportation request, a search is made for the further transportation request comprising a description of a load or other transportation service based on the estimated time of availability.

DETAILED DESCRIPTION

Overview

Figure 1:
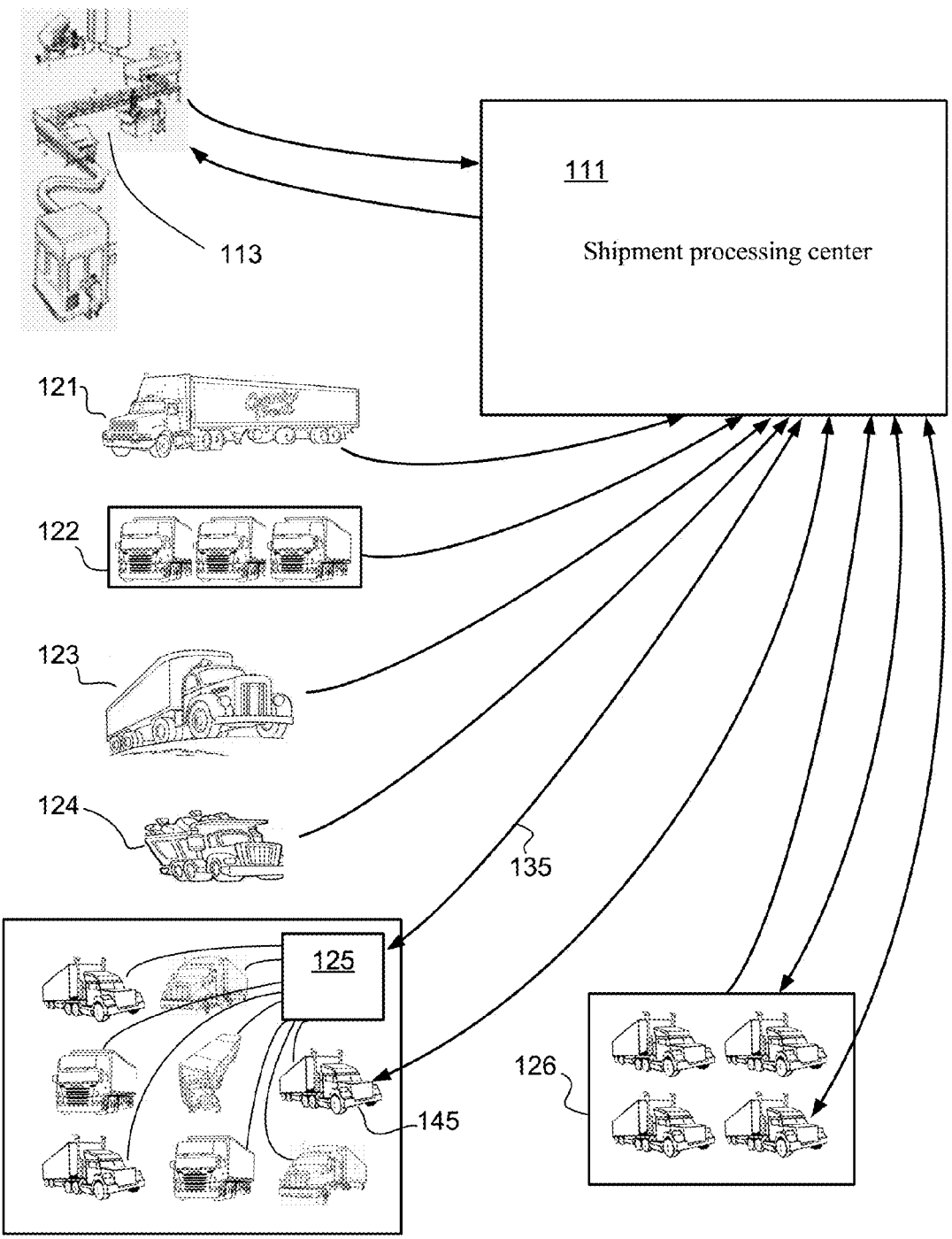
FIG. 1 is a schematic diagram showing the system's interaction with interested parties.

An automated system is configured to list and accept bids for transportation services. In doing so, bids are taken directly from Transportation Service Providers (TSPs), from brokers and other intermediaries who in turn seek bids from TSPs or otherwise obtain bids from TSPs and other sources. In addition, the bids can be used for bid estimation, in which participating TSPs may be given an opportunity to engage in a "reverse auction" bid in order to fill a need for obtaining a transportation order. The system can receive bids in email, web, SMS, interactive voice response (IVR), telephone communications not using IVR and other suitable interfaces.

Non-limiting examples of transportation services are shipments of loads and related trucking services. Transportation services can include moving passengers, taxi, car services, and so-called "ride sharing" services in which a central business arranges rides for fares, in which case the load can be a passenger or packages. In each of these cases, the transportation service has at least one origin or destination. While "shipper," "consignor," "consignee," "load," "hauler" and "shipment" are described in connection with transportation services, the descriptions are given by way of non-limiting examples. Transportation services also includes providing transportation for items other than loads, so that the "shipper" and "load" may be a passenger or other entity submitting the transportation request, and a "shipment" may be the passenger's trip provided as a transportation service.

In many cases, TSPs use "shipping lanes", which are origin-destination (consignor-consignee) pairs, generally identified by the general geographical areas of the origin and destination rather than the specific location of the origin or destination. Nevertheless, the "shipping lane" may vary in its specificity, depending on a number of factors. For example, if a long distance haul is performed, the TSP may be willing to extend the definition of the shipping lane to cover larger geographic areas for the origin and destination in order to have an easier time to find a return (backhaul) load. To use a specific non-limiting example, if a TSP is providing services between New York and San Francisco, an origin or destination in Philadelphia may be within the scope of the shipping lane, but over a shorter distance, Philadelphia may be a significant diversion from a shipping lane whose terminus is New York.

A "backhaul" is a return leg in a simple two leg departure-and-return trip. Some trips include more than two legs, in which case a "next leg" or "subsequent leg" generally connects a series of legs back to the origin. Such trips with more than one "backhaul" leg can be more profitable, in that there is often an imbalance of transportation needs in both directions of a shipping lane, but are more complicated to arrange because they involve additional arrangements for transportation services and because it is not always apparent how to optimize transportation services bookings. In origin and destination (consignor and consignee) oriented transportation services, it is anticipated that an initial trip will have a subsequent leg. In the case of a simple two-way trip, the single subsequent leg or next leg is a "backhaul." A "deadhead" leg is a leg without a load, but also describes the connection between different termini while empty or not delivering a load.

For purposes of this description, a "round trip" is intended to describe a forward haul in combination with subsequent hauls until the driver returns to a home base. In the case of a forward haul and a backhaul, the "round trip" would be these two legs; however in the case of multiple legs, the "round trip" would include each leg. It is understood, however, that in some cases, a driver will extend the trip through several legs until attempting to return to a home base.

FIG. 1 is a schematic diagram showing the system's interaction with interested parties. The program acts as a system or shipment processing center 111 to receive requests for transportation services, obtain bids from TSPs and engage one or more of the TSPs to provide the transportation services. The shipper or customer 113 provides to the shipment processing center 111 a request, which identifies the transportation service as will be described infra. The central processing center 111 then broadcasts requests for bids. In response, TSPs 121-124, other bid consolidation entities 125 and centrally managed fleets 126 such as private fleets and fleets, will respond to the request with a bid as bidding entities. In addition, the shipment processing center 111 engages other entities which obtain bids from TSPs, such as bid consolidation entity 125. Bid consolidation entities comprise various types of entities that obtain bids, such as, by way of non-limiting examples, load boards, bid consolidators, brokers and partner businesses who also obtain bids or who identify available TSPs. The bids are received from the bidding entities 121-126. Some of these bid consolidation entities 125 require queries to be provided in a particular data format, and so the shipment processing center 111 parses the request for transportation services in order to conform to the format used by individual bid consolidation entities 125, as represented by double arrow 135. Prices are calculated by the shipment processing center, and prices, corresponding to bids plus margin, or potentially commission, are quoted to the customer 113.

After acceptance by the customer or in the case of automatic acceptance in accordance with customer criteria, when a time limit for receiving bids has been reached, the shipment processing center 111 communicates its offer to the customer 113 and after the customer agrees to the shipment processing center's 111 offer, the shipment processing center 111 communicates acceptance of a bid and requests confirmation from the TSP. In the case of bid consolidation entities 125, the confirmation may be directly with the individual TSP 145 represented by the bid consolidation entity 125 or through the bid consolidation entity. Similarly, acceptance and confirmation may be obtained through a centrally managed fleet 126 or multi-vehicle TSP 122 rather than through an individual driver. Finally, additional communication, such as a request for acceptance of location tracking, is made with the individual driver.

The Selection of the bid could be made by the customer 113 or could be made by the shipment processing center 111 on the basis of criteria provided by the customer.

While one TSP is described as providing the transportation service, it is anticipated that some loads will involve plural shipments. These plural shipments may be performed by one TSP or may be performed by multiple TSPs. In the event that the shipment or other transportation service may be split between multiple TSPs, the system will either permit bidding for portions of the shipment or may post bids for multiple shipments.

In obtaining shipping services, a request for shipment is received. The request includes physical characteristics of the load as relevant to shipping, origin and destination information, time constraints, and other requirements and preferences of the shipper. The physical characteristics of the load include a number of factors which may be relevant to the particular load. For example, full truckload cargos of a particular commodity may not need to identify weight (except for regulatory purposes). On the other hand, some cargos need to be transported with suitable equipment, so some food items may need to be transported by reefer, whereas the reefer may be used for some non-refrigerated goods on a backhaul (or forward haul) or a different leg. Similar restrictions apply to different loads with similar equipment, so for example, a milk tanker could be used to ship diesel fuel on the backhaul, but one would not want to ship milk in that tanker in a subsequent run.

In hauling loads, the TSP is likely to want to limit deadheading. Typically, the TSP will attempt to set up a route with a forward leg and a backhaul in one shipping lane, in which both legs involve a load. In some cases, the trip may involve multiple legs, particularly if a particular leg does not typically have strong demand. While it is possible to remain profitable even if one leg, when taken in isolation, is a loss, the TSP will seek overall profitability, and in doing so may accept an unprofitable leg provided acceptance of that less profitable load results in less of a loss than deadheading.

Each of these legs is intended to allow for not exceeding the maximum time that the driver is on the road or that the driver can drive, and other legal restrictions. The legs are further intended to meet other driver and equipment scheduling requirements and any restrictions imposed by the operator or regulations. Additional considerations include necessary turn-around time for the driver at sequential destinations and origins. These turn-around times are dependent on the physical capabilities and local distances between depots, but also depend on the driver's habits and the time and effort of loading and unloading of the cargo.

There are several items that the shipper may either desire or require. These items include the TSP meeting legal requirement such as DOT authority, authority to engage in international shipments and endorsements such as hazmat, tanker and double/triple endorsements, and insurance coverage, and acceptable safety record.

The matching of bids for transportation services with users of transportation services can comprise accepting bids for moving cargo by TSPs for shipments or accepting bids for transporting passengers, as well as other transportation services operating on an "origin/destination" model. The matching of bids can be performed by a method which is initiated by a received transportation request. The request comprises, as necessary, a description of a load or other transportation service, and may, by way of non-limiting examples, comprise:
- a generic description of the load,
- freight class
- origin location of the load,
- destination,
- time of availability of the load,
- timing requirements for pick-up and delivery,
- a requirement for intermediate stops or multiple pickups or deliveries,
- weight, physical dimensions or other relevant attributes of the load,
- material or product description (if not part of the generic description of the load),
- special requirements for the load, such as temperature control (refrigeration or climate control requirements), special handling, etc.,
- shipping containers provided,
- other physical requirements or characteristic of the load,
- type and purpose of transport vehicle,
- acceptability of multimodal transport or other transport requiring more than one TSP or allowing the use of multiple legs,
- times of availability at origin and destination, including terminal hours of operation,
- regulatory compliance and requirements,
- insurance required by the shipper,
- value of load,
- TSPs that should be avoided and cannot be used.
- required qualifications of the TSP, and
- other data required by an entity providing the transportation request concerning the transportation request.

The actual details of the description can vary. For example, 40,000 liters of crude oil need not describe many details unless special equipment such as heating equipment is required. Similarly, a standard intermodal cargo van is fairly described by the class or size of cargo van, along with any special requirements such as hazmat requirements.

In addition to the standard descriptions required for engaging TSPs, additional descriptions can be included. For example, if location tracking of the shipment is desired, the description of the load or other transportation service can include a description of requirements for location tracking.

Using the origin and destination information, a shipping lane is determined, characterizing the transportation request. In some cases, the shipping lane is determined by other characteristics of the load, and these characteristics are taken into consideration when determining the shipping lane. By way of non-limiting example, less than truckload (LTL) shipments may be characterized differently from full load shipments for purposes of determining the shipping lane.

The transportation request is parsed by extracting data in order to obtain criteria needed to fulfill the transportation request. If done correctly, the criteria for the transportation request will be an accurate description of the desired transportation service and the transportation lane. The criteria are then distributed as a request for bids.

There are some bids that are available through third-party bidding or brokerage systems, which may also be automated. Such third-party bidding may be, by way of non-limiting examples, load boards, bid consolidators, and partner businesses who also obtain bids or who identify available TSPs. Since the third party software may have a different format from that of the disclosed system, the parsed data is matched to the required format for each third party system and is submitted. The bids are received thru email, directly into the system (e.g., via web interface), phone, mobile SMS, IVR and other suitable interfaces.

Direct bids and bids from third party bidding or brokerage systems are received and evaluated. One or more bids are selected according to predetermined criteria, which may comprise lowest price, category of TSP, scheduling, reputation, relationship, third-party intermediate stops and shared cargo space, and willingness to accept location tracking. Since bids are obtained from third party bidding, the disclosed technique creates a "network of networks" by which a shipper or other entity submitting the transportation request can obtain transportation services on a competitive bid basis by using a single contact. Non-limiting examples of third party bidding would be bidding by brokerages, consolidators and other intermediaries. In that way, instead of reviewing separate listings of bid response data from multiple sources, the shipper is able to review prices quoted for all bids in a single action, with desired options presented. The transportation service bids are thereby received from at least one of the respondents, and stored as an aggregated bid database. As a single list, the bids can be arranged in order by category. Some of these categories include options, such as the willingness to accept location tracking or direct shipment from origin to destination without intermediate stops.

The bids are then converted to prices, which are computed based on a commission or a margin that may vary or fee for the service of obtaining and following through with the bids. In many cases, this is a fixed price, but prices may vary in accordance with business need. These prices are provided to the shipper, including information regarding included options as a part of individual bids by using one or more computing devices to calculate a bid commission or margin for applying to render the prices corresponding to the bids. As described here, the "bid" is the amount the TSP or TSP's representative quotes for the transportation service. The "price" is the amount the shipper pays. The difference between the "bid" and the "price" is the margin.

The prices are quoted to the shipper in an ordered format. The quotes can be arranged according to an order desired by the shipper, such as by price order, by listing according to option, by reputation of the TSP or by estimated time for delivery. The shipper then selects a price quote. Alternatively, the shipper may select a priority of criteria by which the TSP is selected, which may be, by way of non-limiting examples:
- price, if delivered within a specified time period
- price, if delivered within a specified time period but only if the price does not exceed the median of all prices
- unconfirmed availability of location tracking, but only if within 10% of minimum quoted price.

If the shipper first selects a priority of criteria by which the TSP is selected, and then elects automatic selection, the TSP is selected according to the criteria. One of the advantages of pre-established criteria is that the shipper need not evaluate bids, but rather establish criteria for the bids and await further information regarding the transportation services.

Since there can be a time lag between submission of the bid and the acceptance of the price, there is a possibility that the TSP is no longer available upon acceptance. Therefore, upon acceptance, the selected price is matched to the bid and the TSP is asked to confirm the acceptance as a confirmed bid. This becomes an agreement to provide services.

If the bid included acceptance of location tracking services, it is still desired to obtain confirmation of acceptance of tracking from the holder of the mobile device to be used for tracking. This could be achieved by identifying the mobile number used by the driver. A text message could be sent to the driver asking for confirmation of acceptance of mobile device tracking for the purpose of tracking the delivery. If the driver replies with an acceptance, then that is considered to be an "opt-in" confirmation of acceptance of tracking. Additionally, this confirmation can be established through the driver calling an interactive voice response system or another entity.

The text message may be configured to further obtain permission to use the tracking information to offer loads for a backhaul or "next leg" shipment. That serves two purposes:
1. It obtains consent to the use of the location information for a further purpose; that is marketing of further brokerage services for the "next leg"; and
2. It determines if and when the TSP or driver is available for "next leg" transportation services.

It is possible that unexpected circumstances could occur resulting in delay of the driver to an extent that would result in the "next leg" shipment needing to be reassigned. This delay would appear as part of the tracking of the shipment. In such a case, the shipment processing center can use the information to reschedule the driver and find a different resource to service the initial next leg shipment. Permission to use the location data for this purpose ("next leg" scheduling) can be part of the original consent to use location services, or the system can call or text, to obtain permission to use the location data to reschedule the driver. In either case, the driver or TSP is made aware of the availability for rescheduling services.

Figure 2:
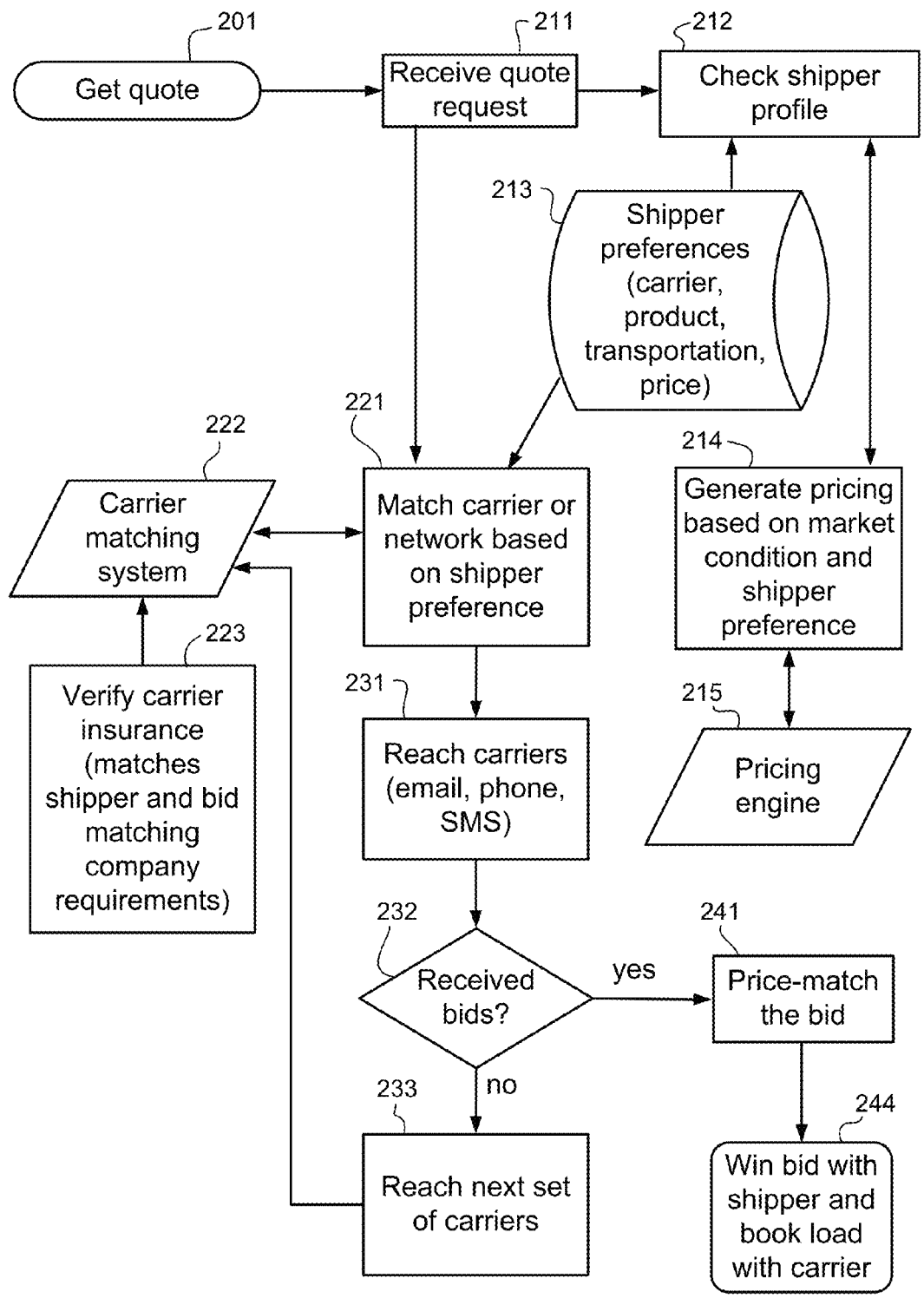
FIG. 2 is a flow diagram showing the operation of the system.

FIG. 2 is a schematic diagram showing the system's interaction with interested parties. FIG. 2 is a schematic diagram showing the system's interaction with interested parties. The process starts with a request to obtain a quote for transportation services (step 201), which may be received from a shipper or other interested party. The quote is received (step 211), and when received, the shipper's profile is checked (step 212), including potentially checking shipper preferences, volume, commitment, financial health, payment history and requirements (step 213). Pricing is estimated based on market condition and shipper preferences or pricing is determined by instantly receiving costing information and applying a margin (step 214), with pricing factors generated by use of a pricing engine (step 215) which can estimate market pricing and uses shipper preferences and attributes to provide pricing estimates according to market conditions and the shipping requirements as specified by the shipper, which are accessed from a shipper database (step 213).

The step of estimating pricing (step 214) provides an estimate of cost. It is common for brokers to estimate their costs using various sources of data, and provide a price during the bidding phase, and once the shipper has accepted this submitted price, the brokerage will then secure transportation resources. The brokerage expects that these transportation resources will be provided at the expected cost or below. The estimated pricing can be used for some types of shipments, for example LTL shipments. In such a case, it is possible to estimate instant costing. It is then possible to apply a margin and then generate a price within a short time period. For non-LTL (normal) shipments, a cost and price can be quickly estimated (steps 214 and 215), and once the shipper accepts, the capacity is sourced. For non-LTL "covered pricing only" the system seeks out the carrier first, and once a cost is obtained from the carrier, a price is presented for the shipper to accept or reject.

TSPs, including TSPs represented by other networks are matched to the shipper based on preference, service areas and profile metrics of the aggregating carrier and of the TSPs from that aggregating carrier or the TSPs directly and bids are solicited (step 221). This may includes providing a carrier matching system (step 222), and may further include matching further requirements such as verification of insurance coverage by the carrier for insurable losses involving the cargo (step 223) and protection from lawsuits resulting from TSP involved accidents. Upon identifying TSPs and networks of TSPs that are acceptable, the system (my vote is system) reaches to the TSPs and networks of TSPs to obtain bids for a specific scope of transportation work (step 231). A determination is made if bids are received (step 232), and if not, the system repeats the search for matching TSPs (step 221).

If bids are received, one or more bids have their costs then marked up to generate associated pricing, to provide prices corresponding to the bids (step 241). By way of non-limiting example, the prices correspond to the bids according to a price-plus-margin calculation; however, if additional services, such as location tracking, are rendered, the corresponding price may be adjusted accordingly. The system or the entity requesting the quote for transportation services selects a bid with its associated pricing and then the system awards the bid and its cost to the TSP (step 244).

The automated check conveniently provides a "network of networks" in that the shipper or entity requesting transportation services is able to obtain prices for transporting loads or other transportation services from a single service which obtains bids from different sources and aggregators of different sources. On receipt of a request from a shipper, requests for bids are sent to carriers, directly and indirectly and, if available, additionally one or more on-line networks are automatically queried for bids. These steps are initiated with the bidding process (step 201 in FIG. 2).

The bidding process initially comprises setting up the bid invitation on an on-line database via email, web, SMS, fax or other suitable interface. The bid invitation includes the specifications for the bid, such as full load, weight, commodity, dimensional requirements, and special cargo requirements. Generally loads are bid for carriage on the TSP's equipment; however, this can include intermodal carrier chassis and can specify "power only" for trailers in the possession of the shipper.

Further specifications can be either mandatory or optional. A non-limiting example of an optional specification would be the acceptance of location tracking. If a shipper wishes to have location tracking, but is willing to accept non-tracked transportation, the bid would indicate whether the TSP has agreed to location tracking. In some cases, the entity entering the bid (e.g., a broker) will not be able to guarantee that the TSP will accept location tracking, in which case, the bid can, by non-limiting example, be set to indicate "unknown".

The LTL pricing database is accessible directly by bidders. In addition, it is possible to scan other shipping logistics databases to obtain bids. In the case of scanning for bids from other shipping logistics databases, it is necessary to determine whether the bid represents "co-brokering" or "double-brokering". If the bid represents "double-brokering", the system may determine:
　if the double-brokered bid identifies the TSP,
　if the double-brokered bid permits identification of the TSP before acceptance of the bid,
　if the double-brokered bid permits identification of the TSP only after acceptance of the bid (with or without a right to decline the bid) as a non-limiting example the TSP is identified on the bill of lading (BOL),
　if the double-brokered bid does not provide identification of the TSP, or
　whether acceptance of the double-brokered bid would be a violation of law or good business practice.

The check on whether the double-brokered bid would be a violation of law has obvious implications, but also allows the system to seek bids from brokers who would otherwise have concerns about responding to another broker, because assurance would be available that an illegal bid would not be accepted. One of the advantages of automating the check to include double-brokered bids is that the automated system can enforce compliance of carrier disclosure laws and regulations, while at the same time assuring the broker involved in the original bid retains the brokering or bidding relationship with the TSP. This also makes it easier to obtain information for location tracking such as the identification (phone number) of a mobile communication device used by the driver, as well as the proper consent for location tracking and for direct follow up with that TSP.

Multimodal Movement

As the term implies, multimodal movement exists where and when a load is transported across multiple transportation modes. The most familiar form of this is intermodal freight transport using intermodal containers or ISO containers, sometimes referred to as shipping containers. These containers are designed to be transported by ships or barges, by rail and by truck. In the case of truck transport, ISO containers are typically carried on specialized trailers or semi-trailers, called "frames." Other multimodal systems include "piggyback" trailers, which use full semi-trailers intended for carriage on specialized railcars. In addition, various forms of cargo are often transported using multimodal systems, such as is implemented by package express companies using a mixture of local delivery trucks, semi-trailers for inter-city transport, and/or air transport. Other forms include, by way of non-limiting example, containerized shipping using various configurations of containers.

When implemented according to the disclosed techniques, the multimodal operation can be through a single provider, or can be separately provided by different TSPs. This allows TSPs who do not have combined transportation service or the full desired service area, to make arrangements with other carriers in multimodal transportation to bid for a segment of the multimodal leg, while allowing further arrangements to be made by the disclosed system.

It is anticipated that, in some cases, one or more modes in a multimodal shipment will be used at fixed rates, so that no bid is required for that mode. Such an arrangement expedites the operation of the bid and pricing system by reducing the total number of segments which must be bid. When multimodal bids are included, the shipper may receive a bid that is door to door service or may receive the quoted prices for the multimodal bid, along with non-multimodal bids if the shipper elects to receive both types of bids.

Similar arrangements can be accomplished with people arranging for transportation as a passenger. By way of non-limiting example, instead of separately arranging individual connections to reach a destination, a person (or persons) can request transportation using the disclosed techniques. While a single mode, such as a car or shared van can be used for the entire trip, the passenger can be offered local service to connect with a train, plane or inter-city bus, and further including local service to the destination. In a functional aspect, this allows someone to arrange for "door to door" service. For example, someone going to or from an airport may be able to use bus service configured for the purpose, but without the need to separately arrange for and separately schedule different services.

Next Leg Bids

In some cases, the TSP has already made arrangements for one leg (typically the front haul) but needs to use a bidding process or negotiate for the other leg or legs. This is often the case with private fleet carriers, but also apply to outer situations, such as TSPs making a delivery for an important client on a headhaul, or a TSP with long term contracts and outsourced private fleets. In these cases, there is one leg which is essentially fixed, but the TSP can be flexible for other legs within the time constraints of the pre-existing arrangements. The ability to provide multiple legs can even extend to non-economic matters such as the desire of a driver to pass through a particular location perhaps with specific timing.

Most of the time, a TSP will bid on a single leg, the front haul or a backhaul, regardless of pre-existing arrangements or contracts. Occasionally, a TSP will bid on a round trip or for multiple legs.

The system is capable of using its data to provide information to the TSP relevant to selection of optimum routing in terms of estimated revenue cost and profit, and in terms of market demand. This may be done by offering to provide information to the TSP concerning optimization of shipping lane selection. If the TSP accepts the offer of the optimization information, historic or estimated transportation service data is compared with historic and current data concerning optimization of shipping lane selection, and the TSP is provided with revenue, cost and profit estimation for operation along different shipping lanes. By way of non-limiting example, the optimization data may be obtained by using one of publically available databases, historic data obtained for a plurality of lanes corresponding to at least one origin or destination of the TSP. The comparison with revenue, cost and profit estimation is used to generate information indicating at least one of an optimum shipping lane and an optimum time of operation of the transportation service provider. The information concerning the optimum shipping lane and/or optimum time or operation is provided to the TSP, who can use the information to select a different shipping lane based on the origin or destination. Alternatively, the information concerning the optimum shipping lane and/or optimum time can be used to invite the TSP to submit bids corresponding to the optimum shipping lane and/or optimum time or operation. The information can provide the TSP with general estimates of revenue, cost and profit.

By way of non-limiting example, such use of data may be achieved through calculations of optimum routing obtained by the use of one or more computing devices.

For a "next leg" trip, the system relies on a predictive analytics system, in which factors related to demand for transportation services are calculated based on historical and present data. The predictive analytics system accumulates data regarding historic and current bids, and, based on this data, has a capability of guiding the TSP as to which lane(s) and even which load(s) to take to maximize any of revenue, gross margin or even operating margin. In addition to the bid and ask on the next leg, the system takes into account or considers the following dynamic inputs when providing this guidance:

Market demand for that lane,
Market supply for that lane,
Carrier cost data, variable and fixed,
Current weather, weather forecast,
Road conditions,
Equipment,
Loading and unloading times, and
Regulatory requirements.

Transportation requests are matched to shipping resources and the TSP is matched to the transportation request. At this point, it is possible to request bids from the TSP for the shipping lane. Alternatively, since the market for the shipping lane is already known, the system can make a bid offer to the TSP and enter that bid. The system can also enter a price for customers, based on the market for transportation services, so that the customer can receive a price equivalent to an anticipated low bid and the TSP can be assured a load. Advantages of using calculated market prices are that the TSP can ignore the bidding process and await information regarding an assigned leg. A further advantage is that calculated market rates avoid the possibility of shill bidding intended to artificially drive down prices for a particular shipping lane.

Since the disclosed system is able to determine times for the scheduled trip, these times can be used as a basis for a "next leg." Time estimates related to loading and unloading, as well as other layover times can be added. To this, additional time to deadhead from one destination to a next leg origin is added. In addition, regulatory requirements for rest time and maximum work hours per time period can be calculated, so that an accurate estimate can be made regarding pick-up, and delivery. These times are adjusted to accommodate available hours of pick-up and delivery. Since the TSP is likely to want to select a location for mandated breaks, the availability of the scheduling information facilitates planning.

The TSP can also input additional time for things such as desired break time between loads at a given location, maintenance and meals, as well as providing "breathing room" to reduce time pressure to meet schedules.

It is possible that unexpected circumstances could occur resulting in delay of the driver to an extent that would result in the "next leg" shipment being reassigned. This delay would appear as part of the tracking of the shipment. In such a case, the shipment processing center can use the information to reschedule the driver. Permission to use the location data for this purpose ("next leg" scheduling) can be part of the original consent to use location services, or the system can call to obtain permission to use the location data to reschedule the driver. In either case, the driver or TSP is made aware of the availability of rescheduling services.

The system further determines if the TSP associated with the accepted bid will accept a further transportation request for a backhaul or additional leg, and if so, the system proceeds to make the determination based on an estimated time of availability. If the TSP accepts, a determination is made of a suitable shipping lane. The suitable shipping lane may be defined by the TSP, such as "direct return backhaul requested" or can be calculated based on a number of factors. The factors can comprise, by way of non-limiting examples:
  permissible deviation from a direct backhaul.
  time allowed by the TSP before returning to the home base.
  demand for transportation services to the home base from intermediate destinations, as determined by historic or current data.
  market demand for transportation along different shipping lanes,
  regulatory constraints, and
  destinations requested by the TSP.

The system can also adhere to the bid system by running a reverse auction. In the reverse auction, the bidders for a shipment are given the lowest bid and are given the opportunity to replace with an even lower bid. The TSP looking for the load can then compete fairly in the market and in that way avoid deadheading.

Figure 3:
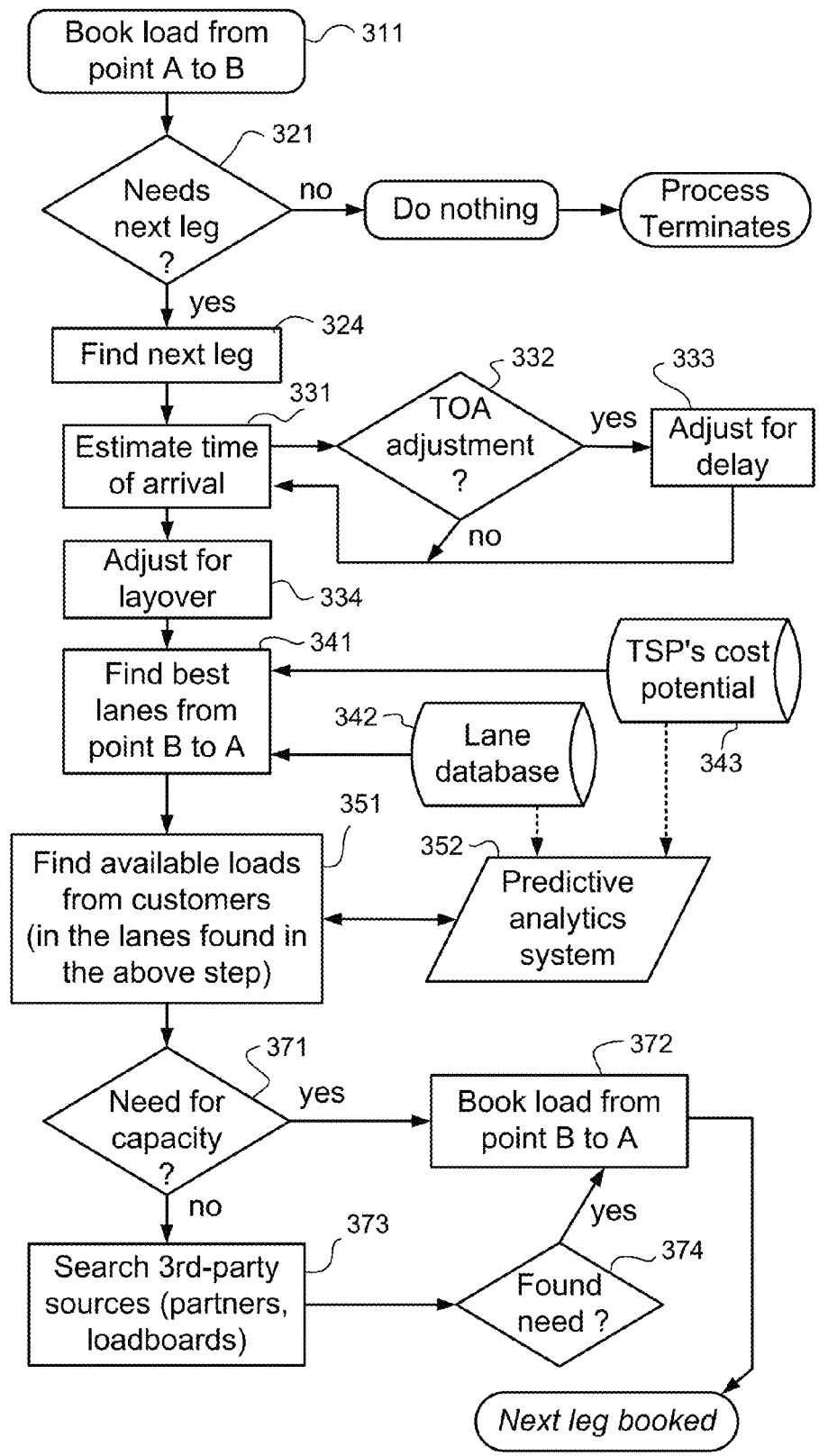
FIG. 3 is a flow diagram showing the operation of a "next leg" function.

Referring to FIG. 3, the "next leg" function is performed in response to booking a previous load (step 311). The sequence varies from the initial bid process in that the "next leg" function is initiated by the requirements of the TSP; however, the financial arrangement for providing transportation services to shippers is similar to that used in the initial bid process.

In response to the booking of the previous load (step 311), a determination is made (step 321) whether the TSP requires (requests) a next leg (step 324). If a next leg is not required, the "next leg" function does nothing and the process terminates. If a next leg is requested, a next leg booking process is initiated (step 324). The estimated time of arrival (TOA) is made (step 331), which will be used for scheduling. A determination is made as to whether there is a TOA adjustment (step 332) based on deviations in the tracking location of the present shipment or an external factor such as traffic or weather conditions. If there is a delay, an adjustment to the TOA is made (step 333). The adjustment may be made based on a calculated TOA or may be input to the TOA calculations as an adjustment, but in either case the result is an adjusted TOA. The TOA or adjusted TOA is then adjusted for a layover (step 334). The adjustment for layover may also be recursed to adjust for deadhead time for connecting to the next leg origin location.

The system determines the best lane(s) for the next leg (step 341), based on demand for transportation services, historical demand for transportation services and cost factors, using information obtained from a lane database (step 342) and from considering the TSP's variable and fixed cost potentially (step 343). The desires of the TSP to remain within a particular geographical territory, the desire of the TSP to return to a home base according to a particular deadline and other routing preferences are incorporated in the determination of the best lanes for the next leg (step 341).

Using the "best lanes" information, the system finds available loads from customers (step 351), using a predictive analytics system (step 352). The predictive analytics system uses historic and present data regarding demand for transportation services and historic and present data regarding costs and availability of transportation services along the lane. The use of the predictive analytics system (step 352) allows the system to suggest a competitive cost for providing the transportation services. It is possible to either propose this price as an "accept or reject" offer to the TSP and an "accept or reject" price offered to the shipper. Alternatively, the TSP can offer the estimated cost as a bid and enter a reverse auction by which the TSP competes with other bidders for the "next leg" shipment.

A determination is made if there is a practical match between what the TSP is willing to accept to haul one of the matching available loads, and the price the via the system the shipper is willing to pay. If so, the load can be booked. If there is no match, then the system researches sources of loads, to try again to match these to the availability of the TSP's next lag capacity, and if such needs are found (step 374) the load is booked (step 372). If a need for capacity exists, then the load is booked; otherwise search third party sources (step 373).

Shipment and Transportation Service Tracking

Since the initial scheduling estimates are available, the system is able to modify these estimates by using updated information. One approach to this would be on-going tracking of the vehicle, which could be used to predict arrival times or a range of estimated arrival times. Since manual reporting can be tedious (or purposely inaccurate), an automatic system is advantageous. One method of tracking is by use of mobile-to-base handshaking, which gives location information at least as precise as the cellular communication base station, and is often more granular, indicating base station quadrant or even GPS location information. Often such information is restricted, however, and the U.S. Telecommunications Privacy Act prohibits telephone tracking for commercial purposes other than to provide the communication service itself. Such restrictions can be waived, so that, for example, "find my phone" services, by-consent tracking and "push advertising" services are commonly available for people who request them.

In the case of transportation services, a tracking service can track the location of the driver's mobile device, and hence the shipment. The location can provide three things:
1. The location, which can be used to update arrival estimates. The arrival estimates can also be used to update estimates for "next leg" availability.
2. A relative location to external factors such as reported traffic problems. The relative location can also be derived from initial estimates, but a current location provided more granular information of the location of the load.
3. Direct information as to the current location of the shipment. While the time of arrival or other terminal point information is of primary interest to shippers, receivers and other users of transportation services, the actual current location information may also be desired.

The location tracking, updated estimates and providing of information regarding current location of the shipment may be provided by using one or more computing devices to store the information in one or more databases, and to use the information to calculate the updated arrival estimates. This allows recipients of the information to obtain the information without the need for manual queries and permits unattended updates of information and estimates. The computing devices are able to provide an on-line indication of last location information, and information to display the last location information and an estimate of a current location as map data.

By providing updated estimates on arrival, the consignor, consignee and others responsible for shipping or receiving can easily be able to meet the shipment. The estimates and other location tracking information can be provided to consignor, consignor and other interested parties without providing the telephone number of the mobile device. While in some cases, the location tracking information will coincide with the driver's contact information, the driver can separately provide communications contact information and, if desired, use a separate mobile device for location tracking purposes. The location or estimates of time of arrival (TOA) may be made available online. In addition, interested parties may get automatic updates thru SMS, IVR, email and other communication systems.

One of the procedures in selecting the bids is obtaining contact information. In requesting bids, the TSP is asked about acceptance of mobile phone tracking, and requests a mobile phone number for cell phone tracking. An affirmative answer would be sufficient for a shipper to determine whether to accept a price corresponding to the bid, but does not in all cases demonstrate that the driver actually accepts tracking. In addition, there may be circumstances in which the entity placing the bid does not have the authority to consent to location tracking. Upon acceptance of the bid or after the acceptance is confirmed, an SMS text message is sent to the driver, using the provided mobile phone number, requesting the driver to accept tracking. If the driver accepts tracking, the system records the consent on a database and the identification information is provided to a mobile device tracking service. Upon arrival at the destination, a second SMS text message is sent indicating that the tracking service is terminated, and the tracking service itself is terminated. If the next leg is to be tracked, the second SMS text message indicates that the tracking service is being continued through the next leg, in which case the tracking service is continued. The mobile device tracking service also accepts direct requests to terminate tracking; however, since the tracking is limited to tracking the trip by shippers, receivers and other parties interested in the shipment, it is unlikely that the driver will terminate tracking. The system stores records of communications related to acceptance of location tracking by the driver and communications relating to termination of location tracking. In one non-limiting example, the system uses one or more computing devices to keep track of different messages sent to the Mobile Owner (MO) and maintains record of messages received from the MO which is stored in one or more databases.

The tracking service has the further advantage of allowing the driver to complete the delivery without manually updating the terminal as to the TOA.

Figure 4:
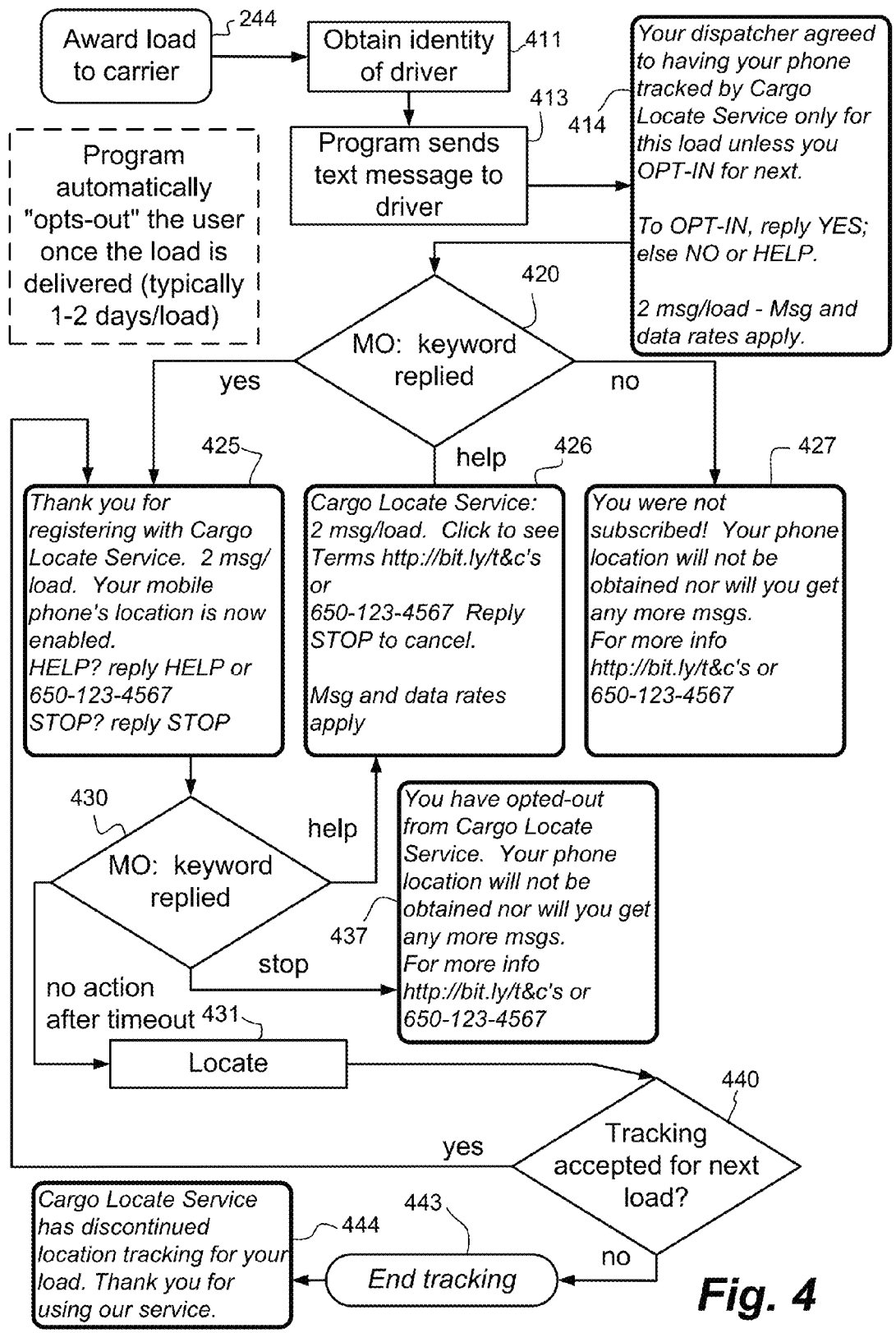
FIG. 4 is a flow diagram showing the implementation of the tracking function.

FIG. 4 is a flow diagram showing the implementation of the tracking function using an automated response unit. The automated response unit uses one or more computing devices and stores data in one or more databases. The tracking function is initiated in response to the bid acceptance system, upon award of the load to the TSP (step 244) but depends on obtaining the mobile phone number for the driver (step 411). The system sends an SMS text message to the driver (step 413) informing the driver of the tracking request (step 414). The automated response unit awaits an SMS reply from the MO of "YES", "HELP", or "NO", and responds accordingly (steps 425, 426, 427). In the event of other than a "YES" response, the system does not engage location tracking, so no action is required to terminate other than to inform the driver that location will not be tracked (step 427) or to enter a "help" menu (step 426). If the driver accepts location tracking, the driver is informed (step 425) and a further keyboard input from the mobile operator is awaited (step 430). If no further response is received, location tracking is initiated (step 431). The driver is still able to respond with a "help" message, which leads to the help menu (step 426), or can issue a "stop" command, which leads to a termination message (step 437). If location tracking is accepted, a determination is made as to whether the driver will accept location tracking for the next load (step 440), then tracking is terminated as appropriate (step 443). On termination, the driver is informed by a further text message (step 444). The termination message (step 444), in addition to advising the driver that the location tracking is not active, also is important because it lets the driver know that other people (personal and business) who may be using the service, will not be able to receive further updated location information through the service.

Location tracking is separately initiated. By way of non-limiting example, the message may be sent directly or through the location tracking service, and location tracking will not be engaged prior to the driver opting in for use of the service. Since this system cannot approve tracking without actual acceptance by the driver, the tracking service will be able to recognize this process as valid consent to location tracking. In one non-limiting example, the tracking starts as soon as the driver accepts tracking (step 425). The reason for immediate tracking is that the immediate tracking will help at the origin location whether the truck is going to arrive on time or not for pickup or also helps the shipper to track approximate time it takes for the driver to arrive. Since the system is able to provide estimations of arrival times, the actual location of the driver can be withheld until a predetermined time before scheduled arrival.

Figure 5:
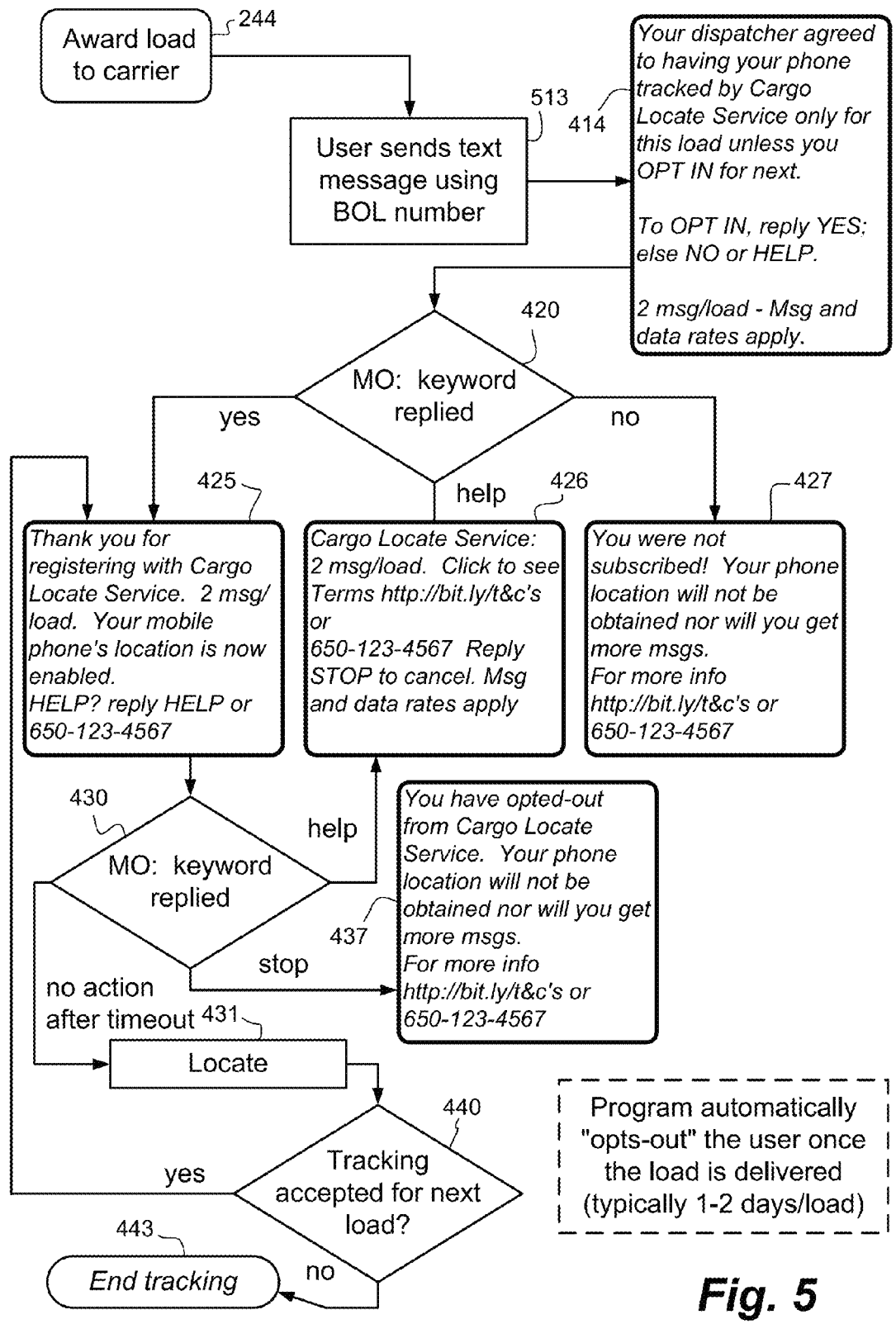
FIG. 5 is a flow diagram showing how a TSP driver accepts mobile tracking on their mobile device.

As an alternative to the system requesting location tracking, a user with the driver's contact information may make the request through the system, as shown in FIG. 5 (step 513). This request can use any convenient means to link the user request to the driver, including, by way of non-limiting example, the shipment's bill of lading number. The SMS message may be transmitted through the program or another technique may be used to link the driver's acceptance to the system. The process for authenticating the driver's "opt-in" acceptance is similar to that of location tracking initiated by the system.

As described above, in an exception to the termination, if the driver is continuing with a further shipment through the system, the mobile tracking service will be continued through the corresponding leg or legs unless the driver terminates tracking.

The tracking information can be useful in assuring shippers and receivers of the whereabouts of their shipments. It is also useful for determining availability of the shipment for logistics purposes, and for purposes of planning terminal operations, such as loading and unloading, hiring of lumpers (if not hired by the driver), etc. In the case of non-cargo loads, the tracking information can be used to provide current updates on the exact time of arrival or pick-up, for example for passengers meeting a transportation service.

The tracking information can also be used for tracking information and lane data about supply and demand for the lane in question. This tracking can in turn be used to predict revenue that could be obtained from alternate shipping lanes as calculated by one or more computing devices. As a result, it is possible to use the tracking information to predict gross margin or operating margin that could be obtained from alternate shipping lanes. The tracking information may be used either with or without lane data to predict the gross margin or operating margin. The revenue, gross margin and operating margin predictions can be applied to predict likely revenue, gross margin and operating margin prediction for the transportation service provider from travel along one or more additional lanes by using the tracking information and lane data related to supply and demand for the additional lane in question to predict revenue from operation on that lane, along with predicting gross margin or operating margin expected from shipping on that lane. The tracking, use of the tracking information to predict margins and revenue and to use the tracking information and lane data may be performed by one or more computing devices.

Time Estimates and External Factors

In addition to tracking, external factors affecting scheduling are tracked using one or more computing devices. The most common of these factors are weather and traffic. Since the location tracking indicates the current status of the route used by the TSP, the external factors can be applied to the particular route. While weather may have a more widespread effect, the effect of weather on routing is generally minimal, with some exceptions. Traffic conditions do tend to depend on the route. Traffic and weather can be obtained from various external sources and can be either input automatically or manually input. Once input, the external factors can be integrated with location tracking information so that it becomes possible to account for the effects of the external factor based on the actual location of the driver.

An additional source for determining the effects of external factors is location tracking and other information relating to delays affecting other shipments. For example, if a snowstorm is affecting a major route along a particular shipping lane, that information can be used to predict the effect on a particular shipment.

The external factor is combined with the location tracking in three ways:

1. Location tracking identifies the route taken. Even if the route was taken to avoid the external factor, such as localized weather or traffic problems, the external factor will then be applied to the actual route taken.

2. On any route, location tracking gives a fairly accurate indication of where the load is in relation to an obstruction. If, for example, the obstruction results in an extended backup, but the TSP is nearly past the obstruction, the estimates would be different than if the TSP has just reached the backup. On the other hand, location tracking cannot determine if the driver will take a detour, but this ambiguity can be addressed by providing a range of estimates. Similar considerations are taken when it is not clear as to how the delay will affect scheduling.

3. This type of integration also has the advantage that it can take into account of travel factors, such as the driver being at a rest stop and therefore possibly being unaffected by the external factor. Since the driver is automatically tracked using location information, it is not necessary to call the driver to obtain relevant status updates.

One advantage of updated scheduling estimates is that the receiver, a subsequent shipper or terminal services can monitor when the TSP is expected to arrive. It is also possible for the system to provide the driver with information on avoiding delays, for example by advising the driver of detours, should this service be desired.

The updated scheduling estimates are advantageous when handling valuable cargo, in that shippers and receivers can monitor the transfer of shipments. This is particularly useful in circumstances where the cognizant people are not at the transfer facility on a continuing basis. This also increases the efficiency of the TSP in that the people responsible for transferring the load are given sufficient information to be available for loading and unloading.

The estimated arrivals are implemented with a service which determines matching load or transportation services with TSPs. After obtaining transportation services from a TSP, an estimate is made of a time of arrival (TOA). One or more external factors, such as weather and traffic conditions, are used to modify the estimate. If the use of a location service is provided as a part of the agreement to provide transportation services, the location service is compared to an anticipated location of the driver, using time and distance and mapping software, in order to update the estimate. If, for example, the driver has already compensated for anticipated delays or otherwise avoided the effect of the delay, the estimate would be updated in accordance with the driver's present location. The adjustment in the estimate also takes into account the effect of the external factor on the driver's actual route and location. By way of non-limiting example, the external factor can be input to adjust a Dijkstra time-and-distance calculation or to adjust a modified Dijkstra time-and-distance calculation, to update the estimate. One or more computing devices may thereby be used to update the estimates of the time in transit and delivery time of the load or completion of the transportation service, based on a combination of the location tracking and said at least one external factor by adjusting Dijkstra or similar map routing calculations to render adjusted time of arrival estimates. Therefore, for example, a determination of whether the driver has passed a traffic delay or can be expected to encounter the delay on the driver's route would be used to adjust the estimate.

The adjusted estimate is also made available to the shipper or receiver, or in the case of passenger services, the passenger, who may be arranging to meet the TSP or may be en-route with the TSP, as well as to those arranging to meet the passenger.

In most cases, the delay would not result in a change in arrangements to use transportation services; however, there are instances in which an entity using transportation services would change TSPs in response to rescheduling. In the event that a user of the transportation services has the opportunity to change TSPs, the updated estimate can be used to provide the user with updated information with which to make such a decision. The updated information may also be used to arrange a new shipment or transportation service for which the TSP may meet in accordance with the revised estimate. This affords the timing and scheduling convenience of non-reserved transportation services when using reserved transportation.

As with cargo shipments, updated scheduling information is convenient for passengers. The updated information makes it easier for passengers to meet TSPs and enables people meeting the passengers to know when they arrive. Significantly, for passengers, the wait time meeting point is often more important than the time of departure or arrival.

While in most instances, the updated scheduling will not affect selection of the TSP for handling the transportation service, there could be some instances in which re-scheduling with other TSPs is desired. Such instances would be likely to occur in markets or circumstances in which it is easy to locate other requests for transportation services. In such instances, the early availability of updated scheduling estimates can be used to provide the TSP with a different load. Such an arrangement can help users of transportation services who rely on "just in time" availability of transportation services, and can help the TSPs who wish to minimize turnaround time.

Cost Estimates and Pricing

The costs entailed by a hauler can include a number of factors that can be broken down for cost estimation, using data from a cost estimate database. These factors can comprise, by way of non-limiting example, fuel cost and time to divert to pick up and drop off shipment, time, lumper expense and other incidental costs for loading and unloading the shipment, additional fuel costs attributed to carrying the shipment, potential for delay of the truck due to after-hours arrival, apportioned highway taxes and tolls, and lost opportunity costs resulting from the additional time consumed by engaging in the shipment. The cost estimation can then be used by one or more computing devices to calculate revenue, cost and profit.

Since the costs and the market price of transportation services can be determined or calculated, the TSP can be offered an amount of compensation for any given trip. This is particularly useful for backhaul or next leg trips, in that the TSP can accept the amount without the need to enter the bid process. This places the TSP in competition with bidders, but it is possible to include the particular TSP and all bidders with a "reverse auction" by which the lowest bidder is submitted for selection by the shipper. Since the TSP looking of a next leg is to some extent committed to making the trip, that TSP has an incentive to provide a lower bid.

The cost estimates can also be used to determine the cost of deadheading or waiting for a bid, vs. taking a low cost shipment. These estimates can be made granular enough that the TSP can describe a cost differential that would render sufficient profit (or reduced loss) for the TSP to accept a shipment. Thus the required compensation to compensate the TSP for additional fuel, wear and apportioned road use fees can be estimated and compared to a deadhead shipment. As an alternative, the information can be used to give the TSP a range of expected prices, so that the TSP can elect to wait for a load rather than deadheading.

CONCLUSION

The process uses one or more computing devices with which to query respondents, gather the bids, obtain criteria for the transportation request, store the bids in an aggregated bid database, calculate bid commissions or margins, match the bids from the aggregated bid database to provided prices transmit the bids, query other TSPs implementing particular categories of transportation services, and to determine if the transportation request meets requirements for the further predetermined category of transportation services based on the shipping lane. The one or more computing devices may be used to provide information concerning an identity of the TSP or contact information for the TSP to the entity submitting the transportation request. In addition, the process uses one or more computing devices to provide estimates of times for further pick-ups, the effect of location and of external factors on expected arrival times, calculating revenue, cost and profit of backhauls or next leg trips. Further operations involving one or more computing devices comprise querying at least one of on-line databases or the respondent concerning qualification criteria of the TSP, and to look up the respondent's reputation in one or more databases and to query on-line databases concerning the qualification criteria of the TSP.

If multimodal transportation services meet acceptance criteria for the transportation request, one or more computing devices may be used to determine if the transportation request meets requirements for the multimodal transportation services based on the shipping lane, and to query TSPs of multimodal transportation services One or more computing devices may be used to determine a cost estimate for a destination leg of the multimodal transportation services based on at least one of historic data or current bid data. One or more computing devices may be used to generate the transportation documentation.

It will be understood that many additional changes in the details, steps and procedures, which have been herein described and illustrated to explain the nature of the subject matter, may be made by those skilled in the art within the principle and scope of the invention as expressed in the appended claims.

What is claimed is:

1. A method for determining matches for load or transportation services with transportation service providers and providing estimated arrival times, the method comprising:
    receiving a transportation service request comprising a description of a load or transportation service;
    providing the transportation service request to a plurality of transportation service providers;
    receiving bids to provide the requested transportation service from one or more of the plurality of transportation service providers; storing said bids in a database;
    using one or more computing devices to perform one of automatically selecting a bid from the database based on predetermined criteria provided by the entity requesting the transportation service or automatically presenting prices corresponding to received bids for selection by the entity requesting the transportation service;
    making a selection of a transportation service provider for meeting the transportation service request, and electronically storing data concerning at least one of a driver or a mobile device used by the driver for the transportation service provider in a database of selected transportation service providers;
    determining a selected bid and associating the selected bid with a respondent identified in the bid;
    communicating award of the selected bid to the party providing the bid, and obtaining confirmation of acceptance of the bid;

storing, on one or more electronic databases, history of at least one of the transportation service provider or the driver related to time factors comprising time in transit;

storing, in a road condition electronic database, a list of weather conditions and anticipated effects on travel times on different categories of highways;

communicating a query to the transportation service provider or driver concerning acceptance of mobile telephone tracking (opt in) by the transportation service provider or driver associated with the bid, obtaining a mobile telephone number or other identifier of a mobile device, and electronically storing the response with the accepted bid;

in the case of acceptance of mobile telephone tracking (opt-in) by the respondent without direct authorization by the transportation service provider or operator, using one or more computing devices to automatically communicate with the obtained mobile telephone number to confirm acceptance of mobile telephone tracking (opt in), and electronically storing an indication of the confirmation in one or more databases along with a confirmation descriptor;

using one or more computing devices to automatically access a mobile telephone location service to obtain location information based on the mobile telephone number or other identifier of a mobile device for the respondent and prior to pick up, after loading the shipment or upon initiating a transportation service, conditional on the one or more computing devices automatically obtaining consent using at least one consent procedure for implementing location services;

using one or more computing devices to estimate a time of arrival estimate based on an estimation of a time for performing a delivery of the load or providing the transportation service;

obtaining at least one external factor expected to affect transit time and adjusting the time of arrival estimate according to the external factor to provide an adjusted time of arrival estimate, said at least one external factor comprising weather reports and forecasts, and further comprising real-time traffic conditions if available;

using one or more computing devices to apply the history of the transportation service provider or driver to at least the time in transit, and to automatically adjust the updated estimates of the delivery time of the load in accordance with the history of the transportation service provider or the driver;

using one or more computing devices to compare the weather reports and forecasts with the list of weather conditions stored in the road condition database and automatically render an adjustment factor for time in transit;

using one or more computing devices to automatically adjust the estimate a time in transit and delivery time of the load or completion of the transportation service according to the adjustment factor;

using one or more computing devices and location tracking to automatically provide updated information on a location status of the load or transportation service provider; and using one or more computing devices to automatically update the estimates of the time in transit and delivery time of the load or completion of the transportation service, based on a combination of the location tracking and said at least one external factor by adjusting map routing calculations to render adjusted time of arrival estimates;

using one or more computing devices to automatically render any alternative routing as determined by the adjusted map routing calculations to render a similar or earlier time of arrival estimate within a predetermined threshold;

communicating information concerning the alternative routing to at least one of the transportation service provider or driver;

determining a communication preference, for time of arrival estimates, of at least one of the entity requesting the transportation service and a receiver of a shipment as the transportation service or a destination contact;

communicating, to at least one of the entity requesting the transportation service and the receiver of a shipment, estimates of changes in estimated time of arrival in accordance with said communication preference;

using one or more computing devices to automatically calculate an anticipated turn-around time for availability of the transportation service provider for a subsequent leg or backhaul and using the adjusted time of arrival estimate and the anticipated turn-around time to estimate a time of availability of the transportation service provider for the subsequent leg or backhaul; and associating the availability of the transportation service provider to accept a further transportation request, corresponding to the transportation service provider's capabilities, for a backhaul or additional leg and if the transportation service provider associated with the accepted bid accepts said further transportation request, based on the estimated time of availability, searching for said further transportation request comprising a description of a load or other transportation service based on an estimated time of availability.

2. The method of claim 1, further comprising:

in the event of the adjustment factor resulting in a change in the estimate of the time of availability of the transportation service provider for the subsequent leg beyond a predetermined amount of change, offering the entity requesting the transportation service an opportunity to cancel the selection of the transportation service provider for meeting the transportation service request and to and reschedule transportation service;

determining the availability of an alternate transportation service provider, and in the case of availability of the alternate transportation provider, offering to the entity requesting the transportation service an opportunity to select that alternate transportation provider or another transportation service provider.

3. The method of claim 1, further comprising:

in the case of the transportation service provider associated with the accepted bid indicating a willingness to accept the further transportation request, determining an offer amount using, as a basis for the offer amount, information selected from at least one of the groups selected from historical bid data, present bid data, historical bid data and data indicating estimated prices for transportation services for the backhaul or additional leg.

4. The method of claim 1, further comprising:

calculating an estimated time of availability of said driver for a backhaul or additional leg based on the adjusted updated estimates of the delivery time, an estimated time of transit from the destination of the first shipment, and at least one factor selected from the group consisting of a driver's or operator's estimate of turn-around time to the backhaul or additional leg, the driver history, and a general estimate of turn-around time; and providing information concerning a further shipping request for a backhaul or additional leg using the estimated time of availability.

5. The method of claim 1, further comprising:

calculating an estimated time of availability of said driver for a backhaul or additional leg based on the adjusted updated estimates of the delivery time, an estimated time of transit from the destination of the first shipment, and at least one factor selected from the group consisting of a driver's or operator's estimate of turn-around time to the backhaul or additional leg, the driver history, and a general estimate of turn-around time; and providing information to the transportation service provider concerning a further shipping request for a backhaul or additional leg using the estimated time of availability.

6. The method of claim 1, further comprising:

for at least one bidder, calculating an estimated time of availability for a backhaul or additional leg; and providing information concerning a further shipping request for a backhaul or additional leg.

7. The method of claim 1, wherein the transportation service request comprises movement of cargo, goods, vehicles, containers or passengers.

8. The method of claim 1, wherein the transportation service request comprises transportation of passengers.

9. The method of claim 1, wherein the searching for said further transportation request comprises extracting data, by one or more computing devices, to obtain criteria for the transportation request, and the extracting data comprises parsing for:

origin location of the load, destination location of the load, time of availability of the load, weight, volume, material or product description, timing requirements for pick-up and delivery, a requirement for intermediate stops or multiple pickups or deliveries, refrigeration or climate control requirements, any other physical requirements or characteristic of the load, type and purpose of transport vehicle, value of load, and required qualifications of the transportation service provider, and other data required by an entity providing the transportation request concerning the transportation request; and in determining if the transportation service provider associated with the accepted bid will accept a further transportation request for a backhaul or additional leg, searching for said further transportation request based on equipment type and capacity.

10. The method of claim 9, wherein the estimate of time for performing a delivery of the load or provide the transportation service comprises:

using one or more computing devices to estimate a time in transit and delivery time of the load based on estimations of pick-up time, loading time, available pick-up hours for the origin location, mapping time and distance calculations, and available delivery acceptance hours for the destination location to provide at least one time of arrival estimate.

11. The method of claim 1, further comprising:

monitoring the further transportation request for a subsequent leg or backhaul as affected by the time of arrival estimate; and in the event of a loss of the transportation request for the subsequent leg or backhaul, from changes in the time, searching for a replacement further transportation request.

12. The method of claim 1, further comprising:

monitoring the further transportation request for a subsequent leg or backhaul as affected by the time of arrival estimate;

for the subsequent leg or backhaul, offering the entity requesting the transportation service an opportunity to cancel the selection of the transportation service provider for meeting the transportation service request and to and reschedule transportation service; and in the event of a loss of the transportation request for the subsequent leg or backhaul, from changes in the time, offering the transportation service provider services in searching for a replacement further transportation request.

13. The method of claim 1, further comprising:

in the event the transportation service provider does not have a load or transportation service request for the subsequent leg or backhaul, or the transportation service provider has not committed to fulfilling the transportation service request for the subsequent leg or backhaul, using the adjusted time of arrival estimate to associate the availability of the transportation service provider to accept the further transportation request.

14. The method of claim 1, further comprising:

in the event the adjusted time of arrival estimate affects a subsequent leg or backhaul beyond a predetermined amount of delay, determining the availability of an alternate transportation service provider to fulfill the transportation service for the subsequent leg or backhaul; and in the case of availability of the alternate transportation service provider and acceptance of the alternate transportation service provider by the system, associating the availability of the delayed transportation service provider to accept a new transportation request in accordance with the adjusted time of arrival estimate.

* * * * *